Nov. 14, 1933.                J. JONAS                    1,935,227
                       FREQUENCY CHANGING SYSTEM
                     Filed Aug. 10, 1932      3 Sheets-Sheet 1

Inventor
J. Jonas
by
Attorney

Patented Nov. 14, 1933

1,935,227

UNITED STATES PATENT OFFICE 1,935,227

FREQUENCY CHANGING SYSTEM

Julius Jonas, Baden, Switzerland, assignor to Aktiengesellschaft Brown Boveri & Cie., Baden, Switzerland, a joint stock company of Switzerland Application August 10, 1932, Serial No. 628,265, and in Germany August 10, 1931

11 Claims. (Cl. 172—281)

This invention relates to improvements in electric current frequency changing systems and more particularly to systems for converting alternating current of one frequency into direct current and then converting the direct current into alternating current of another frequency by means of electron discharge devices.

It is well known that alternating current of one frequency obtained from one electric power line can be converted into alternating current of the same or of another frequency at the same or another voltage in another electric power line by means of a system comprising two transformers associated with an electric current rectifier of the gaseous or metallic vapor arcing type i. e. means for changing alternating current into direct current and with another rectifier of the same type provided with control electrodes and used as an inverter i. e. means for changing direct current into alternating current. A system of the above character transfers energy only in one direction, namely from one of the lines to the other line.

A manual or automatic control of the flow of energy can be obtained by providing such system with additional controlling elements or by providing two systems connected symmetrically with respect to the supply lines.

It is, accordingly, one of the objects of the invention to provide an electric current frequency changing system using electron discharge devices in which system the direction of the flow of energy is reversible.

Another object of the invention is to provide an electric current frequency changing system using electron discharge devices in which system the direction of the flow of energy is automatically controlled in response to the relative conditions in the lines supplying and receiving the current at the moment considered.

Another object of the invention is to provide an electric current frequency changing system using electron discharge devices in which the flow of energy can be maintained at a desired intensity in either direction of flow from the supplying to the receiving lines.

Objects and advantages other than those above set forth will be apparent from the following description when read in connection with the accompanying drawings in which:

Fig. 1 diagrammatically illustrates one embodiment of the invention in which the flow of energy is obtained in either direction between two power lines by means of separate rectifiers and inverters;

Figure 1:
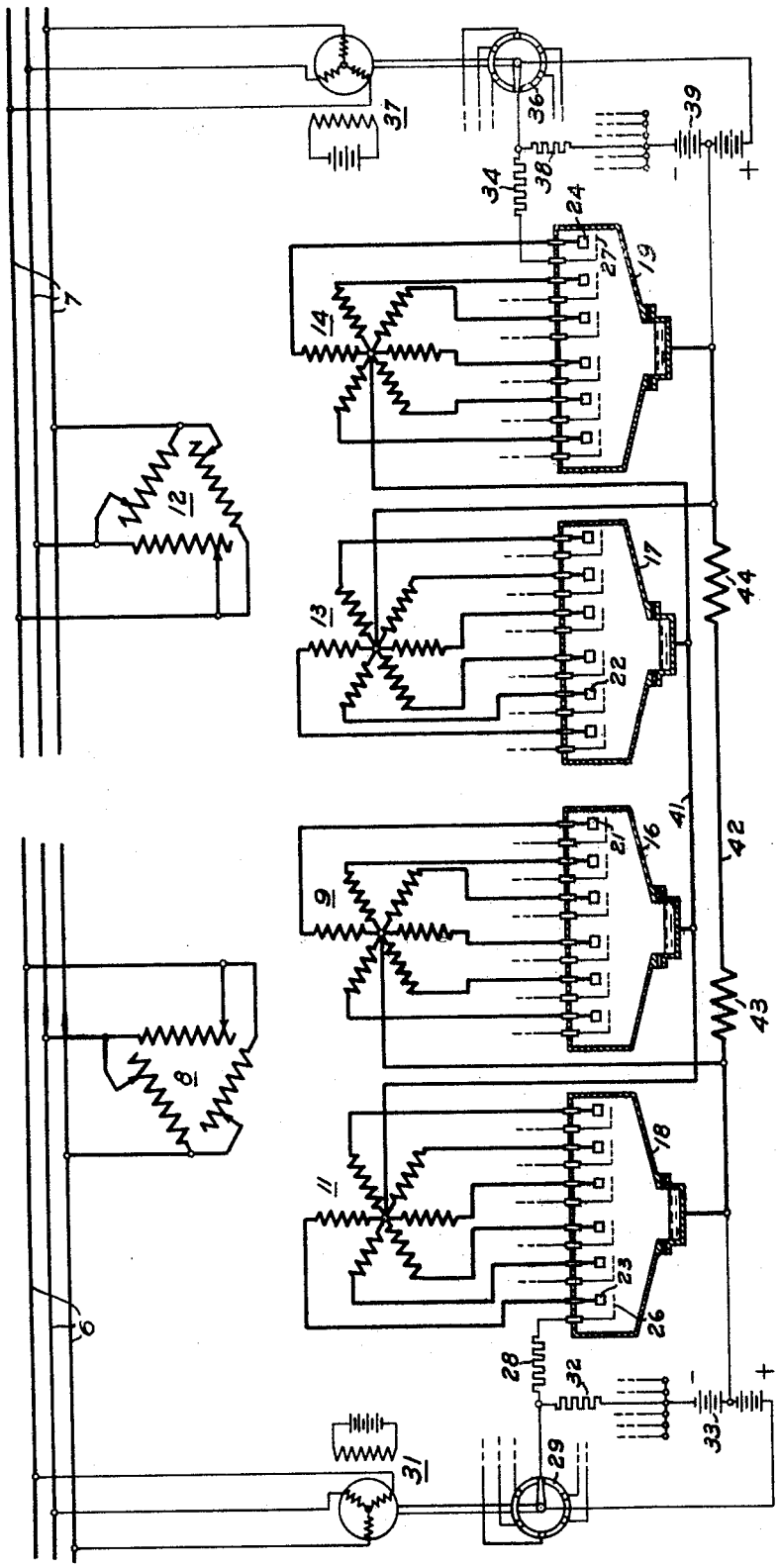

Referring to the drawings by characters of reference, reference numerals 6, 7 designate two alternating current lines between which energy is to be transferred. Each line may be energized by a generator (not shown) supplying electrical energy thereto. When either of such lines is to receive electrical energy, such line may remain connected with a generator or may supply, among other current consuming devices, an alternating current motor or an equivalent device for maintaining the voltage of the line at the desired wave shape and frequency. Each of the two lines may be single phase or polyphase and may carry current at any desired voltage and frequency independently of the voltage and frequency of the current flowing in the other line. Line 6 is connected with a transformer having a primary winding 8 provided with taps and two secondary windings 9, 11 which may have any desired number of phases, the phases of each secondary winding being provided with a neutral point and arranged to deliver identical terminal voltages. Winding 9 energizes the anodes 21 of an electron discharge device 16 of the gaseous or metallic vapor arcing type having its cathode connected with a current conductor 41 and operating as a rectifier. Winding 11 energizes the anodes 23 of another electron discharge device 18 having its cathode connected with a conductor 42 and operating as an inverter. The operation of each anode 23 of inverter 18 is controlled by means of a control electrode 26 connected through a current limiting resistance 28 with a contact of a distributor 29 operated by a synchronous motor 31. Control electrode 26 is also connected through a resistance 32 with the negative terminal of a battery 33 having an intermediate point thereof connected with the cathode of inverter 18 and its positive terminal connected with the brush of distributor 29. Motor 31 is connected with line 6 in such a manner as to rotate the distributor 29 at the rate of one revolution per cycle of the alternating voltage in line 6. A reactor 43 is inserted in conductor 42 for the purpose of reducing the ripple in the direct current produced as an intermediate stage in the frequency converting system.

Line 7 is connected with a transformer comprising primary winding 12 and secondary windings 13, 14 connected with the anodes 22 of a rectifier 17 and with the anodes 24 of an inverter 19 respectively. Inverter 19 is provided with control electrodes 27 associated with resistances 34, 38, a battery 39 and a distributor 36 rotated at the frequency of line 7 by a synchronous motor 37 connected thereto in a manner similar to that of inverter 18.

The construction above described produces a duplicate frequency converting system, the one system consisting of windings 8, 9, rectifier 16 and inverter 19 with windings 14, 12, and the other system consisting of windings 12, 13, rectifier 17, inverter 18 and windings 11, 8. Rectifier 16 operates as is well known in such a manner that the current is carried at each instant by the anode receiving the highest positive voltage from the transformer secondary winding connected therewith. When, during the operation of rectifier 16, the control electrodes 26 of inverter 18 permit operation of the anodes 23 thereof, a short circuit will be established between winding 9, rectifier 16, winding 11 and inverter 18 which are oppositely connected in parallel between conductors 41 and 42. To avoid the occurrence of such short circuit and yet permit operation of either rectifier 16 or inverter 18 dependent on the direction of energy flow, distributor 29 is so adjusted as to permit the operation only of the particular anode 23 receiving the highest negative voltage from the transformer secondary winding 11 at the moment. The short circuit above referred to will then comprise a portion of winding 9 and a portion of winding 11 having voltages equal in magnitude and opposite in direction at the moment, which voltages therefore neutralize each other and do not produce any short circuit current. Similar conditions prevail in the circuit of windings 13, 14. The voltages of windings 9, 11, 13, 14 may be determined irrespective of the line voltages and may be selected at a high value for the purpose of improving the efficiency of the system. Windings 8, 12 are shown as provided with taps so as to permit adjustment of the relative values of the voltages in windings 9, 11 and 13, 14 independently of the voltages in lines 6 and 7.

Assuming that the voltage in line 6 is of such magnitude as to impress a voltage on winding 9 exceeding the voltage impressed on winding 14 by at least the total values of the arc drops in rectifier 16 and in inverter 19, energy will flow from line 6 to line 7 by the following process: Winding 9 and rectifier 16 will supply direct current to conductors 41, 42 by the usual process of rectification. Such rectified voltage will be impressed on winding 14 and will be of such magnitude as to exceed the value of the negative voltage impressed by winding 14 upon the anode 24 made operable by the action of its associated control electrode 27. A current will then flow from winding 9 through rectifier 16, conductor 41, winding 14, an anode 24 of inverter 19, conductor 42, back to winding 9. During the process of inversion in inverter 19, the anode thereof carrying current has the highest negative potential of all anodes of the inverter. When such negative potential is exceeded by that of another anode, the anode is made operative by the action of its control electrode and carries the arc while the first anode ceases to operate for the remainder of the current cycle. The recurrence of the above cycle of operations produces the conversion of the direct current of conductors 41, 42 into alternating current which is supplied to line 7 at the frequency of the voltage impressed thereon by the means referred to previously.

If the voltage of winding 13 exceeds that of winding 11, line 7 will supply current to line 6 by a similar process, employing rectifier 17 and inverter 18 independently of the voltages of the lines 6 and 7.

Figure 2:
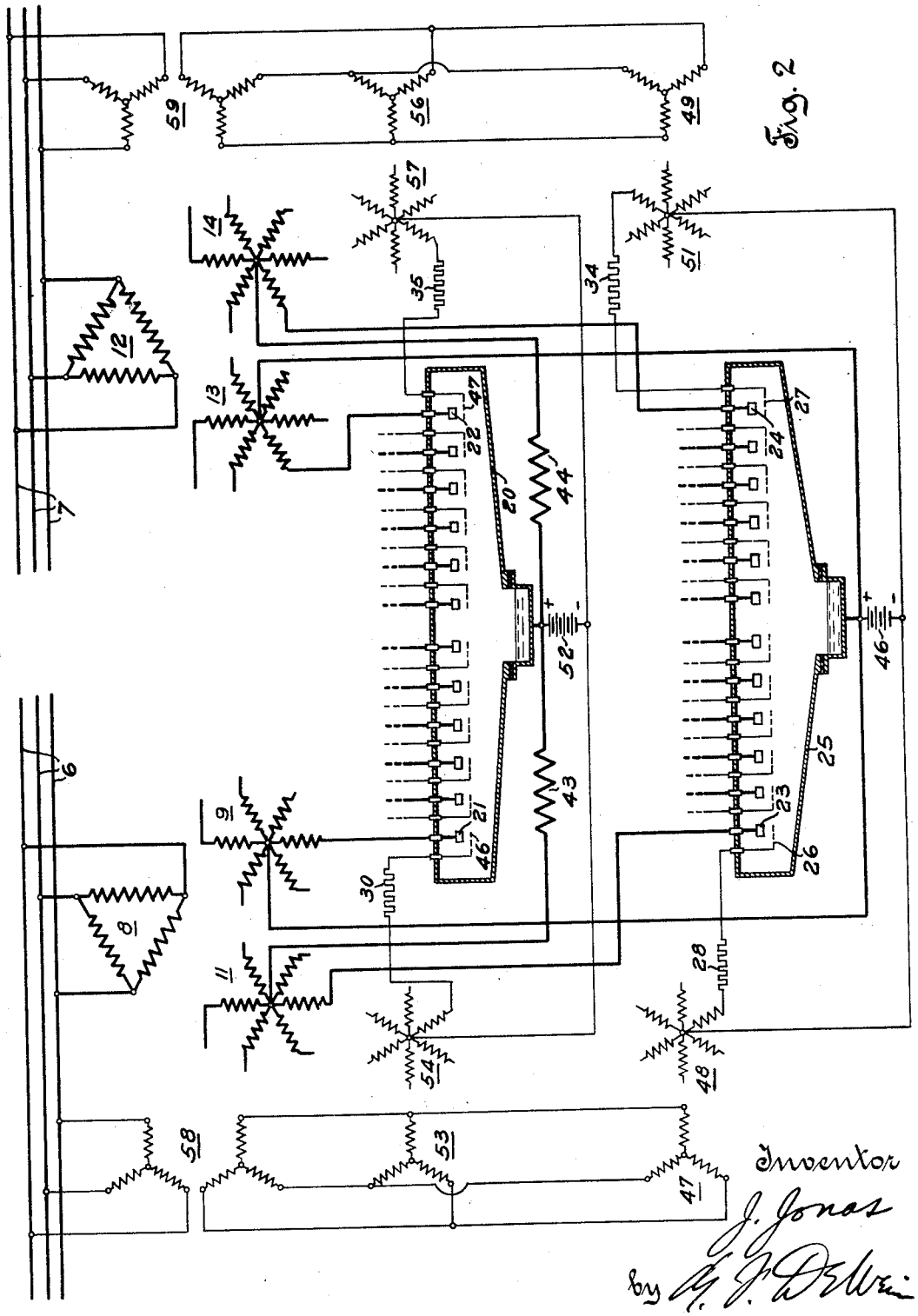
Fig. 2 illustrates a modified embodiment of the invention which differs from that shown in Fig. 1 in the combination of the rectifiers into a single structure and combination of the inverters in a single structure.

In the embodiment illustrated in Fig. 2, windings 8, 12 are not provided with taps for the reason that other voltage controlling means are provided in the system. Rectifiers 16, 17 which were shown in Fig. 1 as separate structures connected to a common conductor 41 are replaced, in the embodiment shown in Fig. 2, by a common structure 20 containing the different sets of anodes 21, 22 connected with windings 9, 13. Inverters 18, 19 are likewise replaced by a common structure 25 containing sets of anodes 23, 24 and their associated sets of control electrodes 26, 27. The control of anodes 23, 24 differs from that shown in Fig. 1 in being obtained from a battery 46 connected with the cathode of inverter 25 and control transformers 47, 48 and 49, 51 respectively connected with lines 6 and 7 through phase shifters 58, 59. The action of the battery and of the control transformers consists in maintaining the control electrodes at a negative potential until it is desired to permit an anode to carry current at which time the control electrode associated therewith has a positive potential impressed thereon for a short period of time, the control thus having the same effect as that described relative to the embodiment shown in Fig. 1. In addition to the above, anodes 21, 22 are likewise provided with control electrodes 46, 47 which are energized through resistances 30, 35 from a battery 52 and from control transformers 53, 54 and 57, 56 connected to phase shifters 58, 59. Because of the action of control electrodes 46, anodes 21 no longer carry current during the period when they receive the highest possible potential from winding 9 but carry current for an equal period of time beginning at the time of positive energization of electrode 46. Because it is necessary that each of anodes 23 be made operable while receiving a voltage equal to that of the operating anode 21 from winding 11 to avoid short circuit currents between windings 9 and 11, windings 54 and 48 simultaneously impress a positive potential on the control electrodes associated with anodes 21 and 23 which then receive voltages equal in magnitude and of opposite signs and therefore displaced by 180 electrical degrees. Anodes 22 and 24 are controlled from windings 57 and 51 in a manner similar to that described above.

The operation of the embodiment illustrated in Fig. 2 is entirely similar to that of the embodiment shown in Fig. 1 and described above with the exception that the flow of current is no longer determined by the setting of taps in windings 8 and 12. If it is desired to produce a flow of energy from line 6 to line 7, phase shifter 58 is so adjusted as to permit the operation of anodes 21 when they receive the highest positive voltage from winding 9, thereby impressing a direct current voltage of the highest possible magnitude on winding 14. Phase shifter 59 is then so adjusted that anodes 24 carry current at periods when they receive a voltage smaller than the maximum voltage from winding 14 thereby permitting the flow of current in windings 14 and the flow of energy towards line 7 even if the voltage impressed on winding 14 is higher than that of winding 9.

Figure 3:
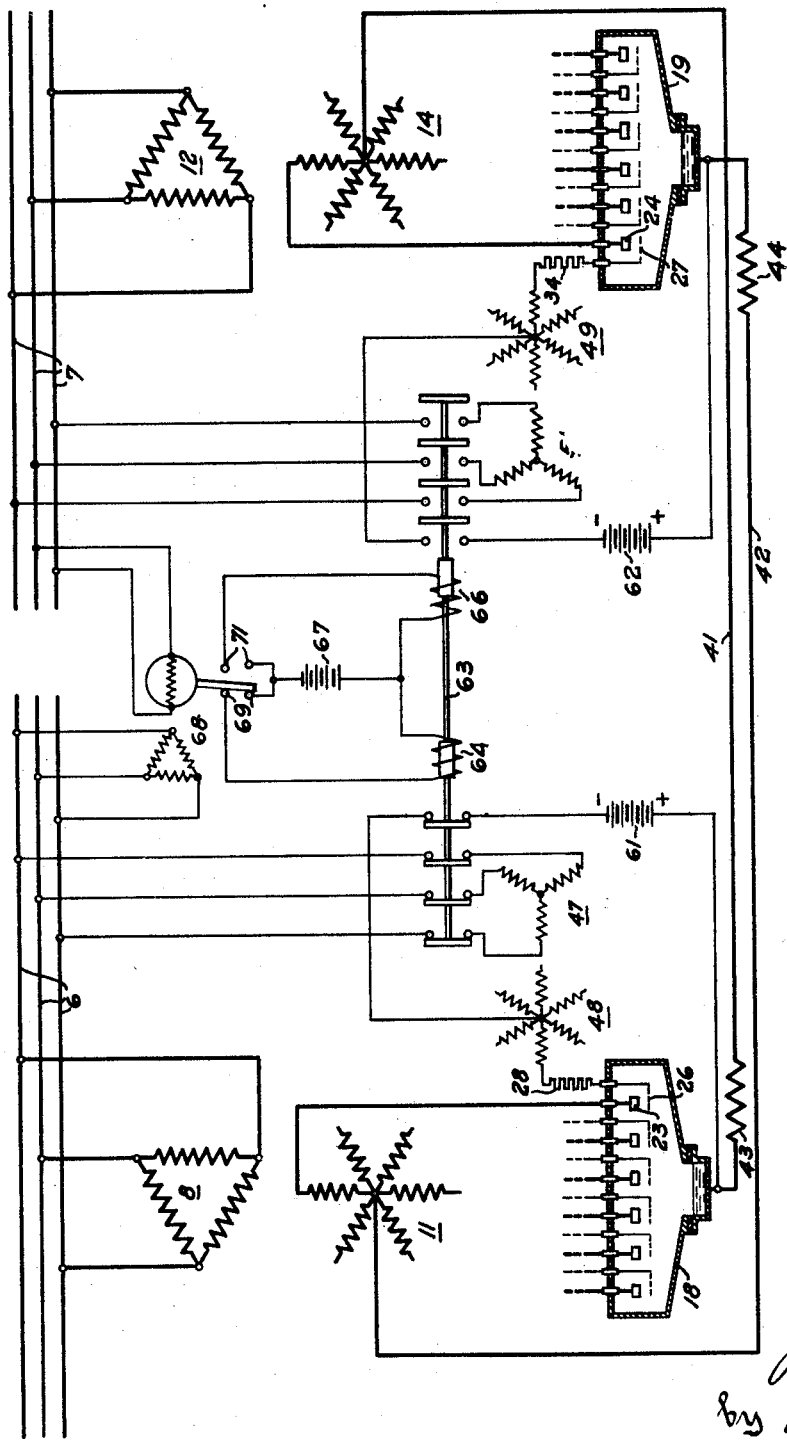
Fig. 3 illustrates a modified embodiment of the invention which differs from the embodiment shown in Fig. 1 in the use of a single converting system in which reversal of the flow of energy is automatically produced by control means dependent on relative conditions of the lines.

In the embodiment of Fig. 1, winding 9 and rectifier 16 are utilized only when winding 11 and inverter 18 are idle and vice versa. Similarly windings 13 and 14 with associated rectifier 17 and inverter 19 are not simultaneously employed. By providing a dual control of windings 11 and 14 and of inverters 18 and 19, it is possible to make each inverter work as a rectifier when the line connected therewith is to supply energy. In the embodiment illustrated in Fig. 3, anodes 23 of inverter 18 are controlled by control electrodes 26 connected with a battery 61 and a control transformer 47, 48 as in the embodiment of Fig. 2. Inverter 19 is controlled by battery 62 and a control transformer 49, 51. A double-throw circuit breaker 63 having operating coils 64, 66 energized from a battery 67, permits connection of the control electrodes of only one of inverters 18, 19 with the associated control equipment. One of the inverters is thus controlled to function as an inverter whereas the other inverter having its control means disconnected, can only operate as a rectifier. Control transformers 47, 48 and 49, 51 are constituted as phase shifters, and are so adjusted that the inverter having its control electrodes energized at the instant considered will receive energy from the line connected therewith and deliver such energy to the other line, even when the voltage of the winding connected with such inverter is lower than the voltage of the winding connected with the other inverter. The direction of flow of energy is thus determined by the position of circuit breaker 63 which can be operated manually or in response to any desired electrical or mechanical values of the system. In the embodiment shown in Fig. 3 it is assumed that, if one of the supply lines becomes overloaded, its generator will decrease its speed thereby diminishing the frequency of the voltage in the supply line. The two portions of a synchroscope 68 are severally connected with the power lines in such manner as to respond to the difference of the frequencies of the supply line voltages and to operate circuit breaker 63 through contacts 69 or 71 thereby producing a flow of energy toward the over loaded line. The nominal frequency of supply lines 6 and 7 may have any desired values which must be taken into consideration in the design of synchroscope 68 to preclude operation thereof when both supply lines are operated at their rated frequencies.

Although but a few embodiments of the present invention have been illustrated and described it will be apparent to those skilled in the art that various changes and modifications may be made therein without departing from the spirit of the invention or from the scope of the appended claims.

It is claimed and desired to secure by Letters Patent:

1. In a frequency changing system, an electric line at any frequency, a transformer connected with said line, an electron discharge device connected with said transformer, a second electric line at any frequency, a transformer connected with said second line, an electron discharge device connected with the second said transformer, said devices being interconnected, and means for causing said devices to function alternately as an electric current rectifier and an electric current inverter.

2. In a frequency changing system, an electric line at any frequency, a transformer connected with said line, an electron discharge device connected with said transformer, a second electric line at any frequency, a transformer connected with said second line, an electron discharge device connected with the second said transformer, said devices being interconnected, and means connected with said devices to cause operation thereof alternately as an electric current rectifier and as an electric current inverter dependent on the direction of energy flow between said lines.

3. In a frequency changing system, an electric line at any frequency, a transformer connected with said line, an electron discharge device connected with said transformer, a second electric line at any frequency, a transformer connected with said second line, and an electron discharge device connected with the second said transformer, each of said transformers having a plurality of secondary windings, said devices being interconnected and being severally connected with a plurality of the secondary windings of said transformers and being arranged to function as an electric current rectifier and an electric current inverter.

4. In a frequency changing system, an electric line at any frequency, a transformer having a plurality of secondary windings, said transformer being connected with said line, an electron discharge device connected with the secondary windings of said transformer, a second electric line at any frequency, a transformer having a plurality of secondary windings the second said transformer being connected with said second line, an electron discharge device connected with the secondary windings of the second said transformer, said devices being interconnected, and means connected with said lines to control the operation of said devices.

5. In a frequency changing system, an electric line at any frequency, a transformer having a plurality of secondary windings, said transformer being connected with said line, an electron discharge device connected with the secondary windings of said transformer, a second electric line at any frequency, a transformer having a plurality of secondary windings, the second said transformer being connected with said second line, an electron discharge device connected with the secondary windings of the second said transformer, said devices being interconnected, and dynamic means connected with and operated in response to the frequency of said lines to control the operation of said devices.

6. In a frequency changing system, an electric line at any frequency, a transformer having a plurality of secondary windings, said transformer being connected with said line, an electron discharge device connected with the secondary windings of said transformer, a second electric line at any frequency, a transformer having a plurality of secondary windings, the second said transformer being connected with said second line, an electron discharge device connected with the secondary windings of the second said transformer, said devices being interconnected, and static means connected with and operating in response to the conditions in said lines to control the operation of said devices.

7. In a frequency changing system, an electric line at any frequency, a transformer having a plurality of secondary windings, said transformer being connected with said line, an electron discharge device having anodes with associated control electrodes connected with the secondary windings of said transformer, a second electric line at any frequency, a transformer having a plurality of secondary windings, the second said transformer being connected with said second line, an electron discharge device having anodes with associated control electrodes connected with the secondary windings of the second said transformer, said devices being interconnected, a source of potential other than said lines, and a rotatable distributor connected with the control electrodes of said devices, said distributor being operated in response to the frequencies of said lines.

8. In a frequency changing system, an electric line at any frequency, a transformer having a plurality of secondary windings, said transformer being connected with said line, an electron discharge device having anodes with associated control electrodes connected with the secondary windings of said transformer, a second electric line at any frequency, a transformer having a plurality of secondary windings, the second said transformer being connected with said second line, an electron discharge device having anodes with associated control electrodes connected with the secondary windings of the second said transformer, said devices being interconnected, and phase shifting transformers connected with said lines and with the control electrodes of each of said devices to control the flow of current therethrough between said lines.

9. In means for interconnecting a plurality of alternating current electric lines at any frequencies, a transformer connected with each of the lines, electron discharge devices having anodes with associated control electrodes, said devices being severally connected with said transformers and being interconnected, means connected with the lines and with the control electrodes of said devices to control the flow of current therethrough, and means operative in response to the frequencies of the lines to control the connection of the first said means with the control electrodes of said devices.

10. In means for interconnecting a plurality of alternating current electric lines at any frequencies, a transformer connected with each of the lines, electron discharge devices having anodes with associated control electrodes, said devices being severally connected with said transformers and being interconnected, transformers connected with said lines and with the control electrodes of said devices to control the flow of current therethrough, and means operative in response to the frequencies of said lines to control the connection of said transformers with the control electrodes of said devices.

11. In means for interconnecting a plurality of alternating current electric lines at any frequencies, a transformer connected with each of the lines, electron discharge devices having anodes with associated control electrodes, said devices being severally connected with said transformers and being interconnected, transformers connected with said lines and with the control electrodes of said devices to control the flow of current therethrough, a circuit breaker controlling the connection of said transformers with the control electrodes of said devices and with the lines, and means operative in response to the relative frequencies of the lines to control the operation of said circuit breaker.

JULIUS JONAS.